United States Patent
Civiero et al.

(10) Patent No.: US 11,492,077 B2
(45) Date of Patent: Nov. 8, 2022

(54) BICYCLE SPROCKET AND SPROCKET ASSEMBLY COMPRISING SUCH A SPROCKET

(71) Applicant: CAMPAGNOLO S.r.l., Vicenza (IT)

(72) Inventors: Mirco Civiero, Montecchia di Crosara (IT); Marco Marchi, Marzabotto (IT); Armando Lagomarsini, S. Giovanni in Persiceto (IT)

(73) Assignee: CAMPAGNOLO S.R.L., Vicenza (IT)

( * ) Notice: Subject to any disclaimer, the term of this patent is extended or adjusted under 35 U.S.C. 154(b) by 380 days.

(21) Appl. No.: 16/748,379

(22) Filed: Jan. 21, 2020

(65) Prior Publication Data
US 2020/0240506 A1 Jul. 30, 2020

(30) Foreign Application Priority Data
Jan. 29, 2019 (IT) .................. 102019000001281

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC .................... B62M 9/10; F16H 55/30
USPC ........................................ 474/152
See application file for complete search history.

(56) References Cited

U.S. PATENT DOCUMENTS

| 5,503,598 A | 4/1996 | Neuer et al. |
| 5,716,297 A * | 2/1998 | Bodmer .................. B62M 9/10 474/160 |
| 5,738,603 A * | 4/1998 | Schmidt .................. B62M 9/10 474/158 |

(Continued)

FOREIGN PATENT DOCUMENTS

| CN | 105691543 A | 6/2016 |
| CN | 106240732 A | 12/2016 |

(Continued)

OTHER PUBLICATIONS

Italian Search Report and Written Opinion in Italian Application No. 102019000001281, dated Jan. 29, 2019, with English translation.

(Continued)

*Primary Examiner* — Gene O Crawford
*Assistant Examiner* — Emily Rose Kincaid
(74) *Attorney, Agent, or Firm* — Volpe Koenig

(57) ABSTRACT

A bicycle sprocket has a plurality of teeth arranged one after the other along a circumferential direction and a plurality of spaces each of which being arranged between two of said teeth. Said plurality of teeth includes at least one first gearshifting tooth and at least one second tooth arranged immediately downstream of said at least one first gearshifting tooth with reference to a rotation direction (R) of the sprocket during pedaling. Said plurality of spaces includes at least one first space defined between said at least one first gearshifting tooth and said at least one second tooth and having a predetermined circumferential extension and at least one second space arranged downstream of said at least one second tooth with reference to said rotation direction (R) and having a circumferential extension greater than that of said at least one first space.

15 Claims, 12 Drawing Sheets

(56) References Cited

U.S. PATENT DOCUMENTS

| | | | |
|---|---|---|---|
| 6,537,173 B2 | 3/2003 | Mercat et al. | |
| 9,403,578 B1* | 8/2016 | Yoshida | F16H 55/303 |
| 2001/0041641 A1 | 11/2001 | Mercat et al. | |
| 2007/0049437 A1* | 3/2007 | Wickliffe | F16H 55/30 474/152 |
| 2011/0065541 A1 | 3/2011 | Lai | |
| 2012/0208662 A1 | 8/2012 | Braedt | |
| 2012/0225745 A1 | 9/2012 | Oishi et al. | |
| 2012/0302384 A1 | 11/2012 | Braedt | |
| 2015/0080160 A1 | 3/2015 | Staples | |
| 2016/0167737 A1 | 6/2016 | Tokuyama et al. | |
| 2016/0362159 A1 | 12/2016 | Braedt | |
| 2017/0233037 A1 | 8/2017 | Hara | |
| 2018/0251189 A1* | 9/2018 | Kamada | B62M 9/12 |
| 2018/0281899 A1 | 10/2018 | Bernardele | |
| 2019/0092427 A1 | 3/2019 | Oka | |
| 2019/0113123 A1 | 4/2019 | Civiero | |
| 2019/0225301 A1 | 7/2019 | Emura et al. | |
| 2019/0225302 A1 | 7/2019 | Emura et al. | |
| 2019/0263473 A1 | 8/2019 | Braedt | |
| 2019/0300109 A1 | 10/2019 | Yamazaki et al. | |
| 2019/0359284 A1 | 11/2019 | Fukunaga et al. | |
| 2020/0140033 A1 | 5/2020 | Kamada et al. | |
| 2020/0269953 A1 | 8/2020 | Fukunaga et al. | |

FOREIGN PATENT DOCUMENTS

| | | |
|---|---|---|
| CN | 108688771 A | 10/2018 |
| EP | 0 700 823 A1 | 3/1996 |
| EP | 1 188 658 A2 | 3/2002 |
| EP | 1 426 283 A2 | 6/2004 |

OTHER PUBLICATIONS

European Search Report for App. No. 20 15 3829.5-1009, dated Jun. 5, 2020.

* cited by examiner

BICYCLE SPROCKET AND SPROCKET ASSEMBLY COMPRISING SUCH A SPROCKET

CROSS REFERENCE TO RELATED APPLICATION

This application claims the benefit of Italian Application No. 102019000001281, filed on Jan. 29, 2019, which is incorporated herein by reference as if fully set forth.

FIELD OF INVENTION

The present invention relates to a bicycle sprocket. The invention also relates to a sprocket assembly comprising the aforementioned sprocket.

Preferably, the bicycle equipped with the sprocket and/or the sprocket assembly of the invention is a racing bicycle or a mountain bike. However, the sprocket and/or the sprocket assembly of the invention can be used in any type of bicycle.

BACKGROUND

As known, the motion transmission system of a bicycle comprises a pair of crank arms, right and left respectively (with reference to the frame of the bicycle and to the advancing direction of the bicycle during pedaling), on which the cyclist exerts a propulsive thrust by means of his/her legs, one or more toothed crowns set in rotation by direct coupling with the crank arms, and a plurality of sprockets, of different sizes, set in rotation by the toothed crowns by a chain.

The sprockets are coupled with the rear wheel of the bicycle by a hub. The latter comprises a first body rigidly constrained to the rim of the bicycle wheel by spokes and a second body rigidly coupled with the sprockets and capable of rotating freely with respect to the first body in a counter-clockwise direction of rotation and of pulling it in rotation in the clockwise direction of rotation (observing the sprocket assembly frontally from the side of the bicycle in which the chain is provided), thus applying the advancing motion to the rear wheel and, therefore, to the bicycle. In the technical jargon, this second body is called "freewheel body".

The plurality of sprockets mounted on the freewheel body is commonly called "sprocket assembly", whereas the possible plurality of crowns coupled with the right crank is commonly called "crankset".

The chain typically consists of a succession of links, each of which consisting normally of a pair of plates adjacent to one another and spaced to define an insertion space for a tooth of a toothed wheel and/or of a sprocket. The plates of a link are rotatably coupled with the plates of the next link by a rivet. Such a coupling is achieved by arranging the end portions of the plates of one link (hereinafter "outer plates" and "outer link") above the end portions of the plates of the next link (hereinafter "inner plates" and "inner link") and inserting the rivet in holes suitably provided on the outer plates and on the corresponding inner plates. A bush configured to rotate freely with respect to the rivet is provided around the rivet.

The terms "outer" and "inner" are used herein with reference to an axis of longitudinal symmetry of the chain, when the chain is arranged open and straight on a plane. Therefore, "outer link" indicates a link whose (outer) plates are farther from the aforementioned axis of symmetry than the (inner) plates of the "inner link".

The transmission of motion from the toothed crowns of the crankset to the chain and from the chain to the sprockets upon pedaling takes place thanks to the thrust exerted by the teeth of the toothed crowns on the bushes of the chain and the consequent thrust exerted by the bushes of the chain on the teeth of the sprockets.

Since the bicycle is a transport device based on muscle propulsion, there is the general need to ensure that the power transmission system from the cyclist to the rear wheel of the bicycle involves the least possible fatigue for the cyclist.

As known, the combination of a toothed crown with a small diameter with a sprocket with a large diameter allows demanding climbs to be tackled ably. However, the same combination, in a flat or downhill route, is disadvantageous since it wastes the energy of the cyclist, who is forced to pedal at a fast rate while the bicycle moves forwards at low speed.

It is thus known to provide the bicycle with a plurality of sprockets and one or more toothed crowns and to select each time, depending on the terrain to be tackled, a specific sprocket and possibly a specific toothed crown (and therefore a specific gear ratio) by means of suitable gearshifting devices (rear and possibly front derailleurs.

Over the years, the number of sprockets used has progressively increased, so as to provide the cyclist with an ever greater number of gear ratios.

At the same time, however, in line with the ongoing effort to lighten the components of bicycles, solutions have been developed aimed at lightening the sprocket assemblies as much as possible.

For example, in order to keep down the weight of the sprocket assemblies and at the same time to be able to use a large number of sprockets the increase in the number of sprockets has typically been accompanied by a reduction of the thickness of the sprockets. Such a solution, however, inevitably causes a reduction of the structural strength of the sprocket and thus has practical application drawbacks.

Whatever the solution adopted in order to allow both an increase in the number of sprockets and a containment of the weight of the sprocket assembly, it is necessary to ensure a precise and fluid gearshifting, i.e. to ensure that the links of the chain engage with the teeth of the sprockets in the shortest possible time and with the maximum possible precision.

U.S. Pat. No. 5,503,598 describes a solution which is said to be suitable for ensuring precise and fluid gearshifting between two adjacent sprockets. Such a solution provides for the definition on both the sprockets of a plurality of gearshifting areas and, in each of such gearshifting areas, the removal of a tooth so as to obtain a passage channel that facilitates the transfer of the chain from the sprocket with a smaller diameter towards the adjacent sprocket with a larger diameter and vice-versa. On the sprocket with the larger diameter, instead of the removed tooth an element (spur) can be provided that is sized so as not to carry out any function during gearshifting and to only carry out the function of guiding and/or stopping the chain during pedaling backwards.

The Applicant has observed that the solution described in U.S. Pat. No. 5,503,598 has the drawback of taking away a tooth from the sprocket (or of providing the spur) right at the gearshifting area, and in particular immediately upstream of the first gearshifting tooth, with reference to the direction of rotation of the sprocket during pedaling. This causes, during the initial steps of gearshifting and irrespective of whether the chain arrives on the first gearshifting tooth with an outer link or an inner link, the stress exerted by the chain on the sprocket to be discharged onto a single tooth (the aforementioned first gearshifting tooth) and the chain to have, immediately upstream of the link that engages with the first gearshifting tooth, a free segment not guided or supported by another tooth.

According to the Applicant it would instead be suitable, in the initial steps of gearshifting, for the chain to engage the sprocket at at least two circumferentially consecutive teeth, engaging on both of such teeth (in the specific case in which the chain arrives on the first gearshifting tooth with an outer link) or being guided and supported laterally by at least one tooth (the first gearshifting tooth) to engage with at least one immediately successive tooth (in the specific case in which the chain arrives on the first gearshifting tooth with an inner link). This is due to the fact that in the initial steps of gearshifting the chain is inclined with respect to the sprocket and is thus subjected to a lateral force component that, opposing the movement of the chain towards the sprocket, risks to obstruct the gearshifting and/or make the chain fall down on the adjacent sprocket with a smaller diameter (in such conditions, also if the gearshifting is completed, it would occur in a not very fluid manner).

The Applicant also believes that, in the specific case in which the chain arrives on the first gearshifting tooth with an outer link, an engagement of the chain with at least also the tooth immediately after the first gearshifting tooth would allow a distribution over many teeth of the load exerted by the chain in the initial steps of gearshifting, which, in the long term, would result in less wearing of the tooth that first engages the chain.

The technical problem at the basis of the present invention is that of lightening the sprocket assembly without for this reason reducing the structural strength of the sprockets and/or penalizing or obstructing the gearshifting.

SUMMARY

The present invention relates, in a first aspect thereof, to a bicycle sprocket, comprising a plurality of teeth arranged one after the other along a circumferential direction and a plurality of spaces each of which being arranged between two of said teeth, wherein said plurality of teeth includes:

at least one first gearshifting tooth;

at least one second tooth arranged immediately downstream of said at least one first gearshifting tooth with reference to a rotation direction of the sprocket during pedaling;

and wherein said plurality of spaces includes:

at least one first space defined between said at least one first gearshifting tooth and said at least one second tooth and having a predetermined circumferential extension;

at least one second space arranged downstream of said at least one second tooth with reference to said rotation direction;

wherein said at least one second space has a circumferential extension greater than that of said at least one first space.

BRIEF DESCRIPTION OF THE DRAWINGS

Further features and advantages of the invention will become clearer from the description of a preferred embodiment thereof, made with reference to the attached drawings, wherein.

DETAILED DESCRIPTION OF THE PREFERRED EMBODIMENTS

Figure 1:
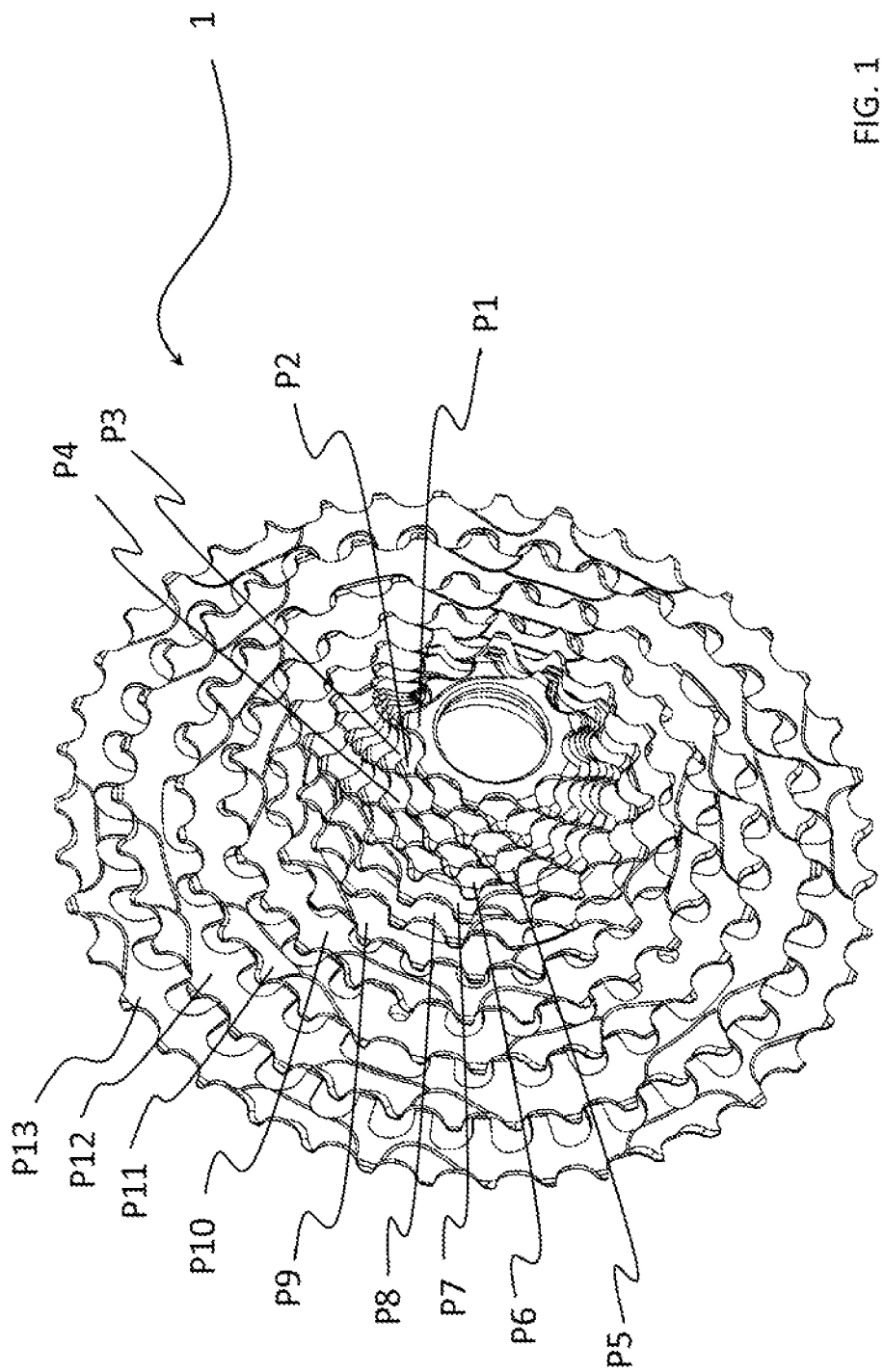
FIG. 1 is a front perspective view of an embodiment of a sprocket assembly in accordance with the present invention.

Although the present invention will be described hereinafter with explicit reference to sprockets and/or sprocket assemblies, what is stated finds analogous application also to toothed crowns and/or cranksets.

Hereinafter, when reference is made to circumferential directions or sizes and to diameters of sprockets, reference will always be made to the primitive circumference of the sprocket, such a circumference being the one which passes through the center of the bushes of the chain when the latter is engaged with the sprocket. In the case in which the circumferential size is not measurable on the primitive circumference since the element we are referring to has a radial extension such as not to reach the primitive circumference, the circumferential size will be measured at half the radial extension of the element we are referring to.

When, on the other hand, reference is made to axial sizes or directions, reference will always be made to a direction parallel to the rotation axis of the sprockets.

The term "gearshifting", unless expressly stated otherwise, refers both to upward gearshifting, i.e. to the movement of the chain from a sprocket with a smaller diameter to an adjacent sprocket with a larger diameter, and to downward gearshifting, i.e. to the movement of the chain from a sprocket with a larger diameter to an adjacent sprocket with a smaller diameter.

The term "gearshifting area" is used to indicate an angular portion of the sprocket comprising the first gearshifting tooth, i.e. the tooth that first engages the chain when, during gearshifting, the chain is moved on the sprocket which such a tooth belongs to.

In the present description and in the following claims the following definitions apply.

The term "tooth" of a sprocket is used to indicate a radial protrusion of the sprocket that, during pedaling, engages with the chain (i.e. it is positioned inside an inner or outer link of the chain) and is pushed by a bush of the chain, contributing to the transmission of motion from the chain to the sprocket.

The sprocket of the invention can be obtained from a sprocket (hereinafter also indicated as "original sprocket") having a predetermined number of teeth (hereinafter also indicated as "original teeth"), at least one of which is subsequently removed or machined, for example and preferably through removal of material, so as not to engage with the chain and therefore not to be defined anymore "tooth". Therefore, the number of teeth of the sprocket of the invention is lower than the number of original teeth of the respective original sprocket.

In the sprocket of the invention, the aforementioned second space can therefore be obtained upon removal of a tooth from the original sprocket (hereinafter, such a tooth is also indicated with the expression "removed tooth"), or upon removal of material from at least one of the side surfaces of an original tooth of the original sprocket, and possibly from at least one of the opposite front and rear surfaces thereof (hereinafter such an original tooth is indicated, once the aforementioned surface processing is completed, with the expression "spur").

In the present description and in the following claims, the term "spur" is used to indicate a radial protrusion formed on a sprocket and that, unlike the teeth, is never engaged by the chain during pedaling. The spur therefore has shape and size different from those of the teeth and such as not to result in an engagement thereof with the chain both in the circumferential direction and in the axial direction when the chain is engaged with at least one tooth of the sprocket.

Advantageously, in the sprocket of the invention, when during gearshifting the chain still has a quite inclined position with respect to the sprocket, the chain engages with at least two circumferentially consecutive teeth (the aforementioned first gearshifting tooth and second tooth), thus quickly taking up a position more parallel to the sprocket (in the specific case in which the chain arrives on the first gearshifting tooth with an outer link) or being properly guided and supported by the first gearshifting tooth before engaging with the second tooth. This results in both a better distribution of the load exerted by the chain on the sprocket during gearshifting (such a load is indeed distributed over at least two teeth, in the specific case in which the chain arrives on the first gearshifting tooth with an outer link), and a reduction of the risk of compromising the gearshifting or of having the chain falling down from the sprocket of the invention onto the adjacent sprocket with a smaller diameter (indeed, in the specific case in which the chain arrives on the first gearshifting tooth with an outer link, the lateral force component which the chain is subjected to is smaller than that which the chain would be subjected to if the chain were engaged on a single tooth and, in the specific case in which the chain arrives on the first gearshifting tooth with an inner link, the chain is properly guided and supported by the first gearshifting tooth before engaging with the second tooth). It is therefore possible to remove any tooth after the aforementioned second tooth from the original sprocket without penalizing the gearshifting, thus obtaining the desired reduction in weight, the thickness of the sprocket being equal.

Alternatively, such a reduction in weight can be obtained, although to a lesser extent, instead of removing a tooth from the original sprocket, by reducing the circumferential extension, and possibly also the axial extension, of such a tooth through removal of material, thus obtaining the aforementioned "spur".

The aforementioned reduction of weight can also be obtained both through the removal of one or more teeth from the original sprocket and through the provision of one or more spurs. It is also possible to provide one or more spurs circumferentially consecutive or preceding one or more removed teeth.

Preferably, the invention has one or more of the features discussed below, taken singularly or in combination except when expressly stated otherwise.

In first embodiments, said at least one second space is defined between two respective circumferentially consecutive teeth.

The aforementioned second space can in this case be obtained upon removal of at least one tooth from the original sprocket, in particular of at least the tooth of the original sprocket arranged between the aforementioned two respective circumferentially adjacent teeth.

Preferably, the circumferential extension of said at least one second space is greater than twice that of said at least one first space. For example, the circumferential extension of the second space can be substantially equal to the sum of that of a tooth (the removed tooth) and that of two spaces (the two spaces adjacent to the removed tooth, upstream and downstream thereof).

It is also possible to remove circumferentially consecutive original teeth, in which case the circumferential extension of the second space would be substantially equal to the sum of that of the removed teeth and of that of the spaces adjacent to the removed teeth. For example, in the case in which two circumferentially consecutive original teeth are removed, the extension of the second space is greater than three times that of the first space. In this case, it could for example be substantially equal to the sum of twice that of the first gearshifting tooth and three times that of the first space.

In preferred embodiments of the invention, the sprocket comprises at least one spur arranged downstream of said at least one second tooth with reference to said rotation direction.

Advantageously, the spur can replace the one that was identified above as "removed tooth". Having a smaller size than the teeth, the provision of one or more spurs makes it possible to obtain the desired weight reduction.

The spur is arranged between the plates of the links of the chain and contributes to holding the latter on the sprocket when not pedaling or pedaling backwards (i.e. when the sprocket rotates in the counter-clockwise direction observing it from the side of the bicycle in which the chain is provided), in this way reducing the risk for the chain to fall down from such a sprocket in the aforementioned travel conditions.

Preferably, the number of spurs (or of teeth removed from the original sprocket) between two circumferentially consecutive teeth of the sprocket of the invention is equal to one or two. Such a number (and in general the number of spurs in the sprocket of the invention or of teeth removed from the original sprocket) can be selected according to the diameter of the sprocket, the number of teeth of the original sprocket and possibly the number of sprockets of the sprocket assembly, so as to obtain an optimal compromise between weight reduction of the sprocket(s) and good engagement of the chain with the sprocket(s). Indeed, it should be considered that as the number of original teeth that are removed or transformed into spurs increases, the quality of the engagement between chain and sprocket decreases.

In some embodiments, all the teeth of the sprocket have the same circumferential extension.

In this case, preferably, all the spaces arranged between the aforementioned teeth, with the exception of those that in the present description and in the following claims are indicated as "second spaces" and "third spaces", have the same circumferential extension.

Said at least one spur can have a radial extension substantially equal to or smaller than that of said at least one first gearshifting tooth (and in general of all of the teeth of the sprocket). The circumferential extension, and preferably also the axial extension, of the spur is in any case smaller than that of said at least one first gearshifting tooth (and in general of all of the teeth of the sprocket), so as to obtain the desired reduction in weight of the sprocket and prevent the spur from contacting the bush of the chain during pedaling and, therefore, wearing by friction or breaking.

Preferably, all of the spurs provided in the sprocket of the invention have same shape and size.

In some embodiments in which the sprocket comprises at least one spur, the circumferential extension of said at least one second space is greater than twice that of said at least one first space. Such embodiments are obtained by removing from the original sprocket at least the original tooth arranged immediately downstream of the one that is machined to be transformed into spur.

In the preferred embodiments of the invention, said at least one second space is defined between said at least one spur and a respective third tooth arranged downstream of said at least one spur with reference to said rotation direction.

Preferably, said respective third tooth is arranged immediately downstream of said at least one spur with reference to said rotation direction and has a downstream side surface defined by an arc of circumference having a first center.

Preferably, said at least one spur has a downstream side surface defined by a second arc of circumference having a second center.

Preferably, the distance between said first center and second center is equal to the distance between said first gearshifting tooth and said second tooth plus at least about 0.5 mm, preferably plus about 1.5 mm.

In this context, the term "downstream side surface" of a tooth or of a spur is used to indicate the side surface of the tooth on which a bush of the chain pushes during pedaling, or the surface of the spur facing on the same side as the surface of the original tooth on which a bush of the chain would push during pedaling. Observing the sprocket from the side of the bicycle in which the chain is provided, the downstream side surface of the tooth and of the spur is the side surface to the left of the tooth or of the spur.

The aforementioned distance is calculated by measuring the distance between two parallel planes that pass one through the aforementioned first center and the other through the aforementioned second center.

In some preferred embodiments, the sprocket comprises a single spur arranged between two circumferentially consecutive teeth.

In the specific case in which the tooth of the original sprocket immediately downstream of the aforementioned single spur is removed, the circumferential extension of said at least one second space is greater than or substantially equal to the sum of that of said at least one first gearshifting tooth and twice that of said at least one first space.

In other embodiments, the sprocket comprises at least two circumferentially consecutive spurs.

Such a sprocket preferably comprises at least one third space arranged downstream of said at least two spurs.

Preferably, said at least one second space is arranged between said at least two spurs and said at least one third space has a circumferential extension greater than that of said at least one first space. Also in this case, the spurs are obtained from respective original teeth that are machined at least on the respective downstream side surfaces.

In particularly preferred embodiments thereof, the sprocket comprises a plurality of first gearshifting teeth and a plurality of spurs, wherein each spur is arranged between two circumferentially consecutive first gearshifting teeth.

Preferably said spurs are angularly equidistant from each other.

More preferably, each of said spurs is arranged in a symmetrical position with respect to a respective pair of circumferentially successive first gearshifting teeth.

The sprocket of the invention is preferably obtained from an original sprocket having a number of original teeth equal to, or greater than, 18.

In the particularly preferred embodiments, a plurality of gearshifting areas can be identified in the sprocket.

In the present description and in the following claims, the term "gearshifting area" is used to indicate the area of the sprocket at which there are the teeth that first engage the chain when gearshifting occurs towards such a sprocket from an adjacent sprocket.

Each gearshifting area comprises a respective first gearshifting tooth, a respective second tooth and a respective first space circumferentially arranged between said respective first gearshifting tooth and respective second tooth.

On the other hand, each second space is arranged outside of each respective gearshifting area.

Each second space can be defined between two respective circumferentially consecutive teeth or between a tooth and a respective spur, exactly as described earlier.

It is possible to provide for an alternation of spurs and removed teeth while progressively moving circumferentially from one gearshifting area to the next one.

Preferably, the circumferential arrangement of the spurs or of the removed teeth is such that the spurs or removed teeth are angularly equidistant from each other. This allows to provide the sprocket with a geometric symmetry and uniformity, to the benefit of the fluidity and precision of gearshifting.

Preferably, many gearshifting areas are provided in sprockets having a number of original teeth equal to, or greater than, 9, more preferably equal to, or greater than, 15, even more preferably equal to, or greater than, 17, even more preferably equal to, or greater than, 18.

Preferably, the number of second spaces is equal to the number of first gearshifting teeth.

In a second aspect thereof, the invention relates to a bicycle sprocket assembly, comprising a first sprocket according to the first aspect.

Such a sprocket assembly has all of the advantages indicated above with reference to the sprocket of the first aspect of the invention.

Preferably, the aforementioned first sprocket is the sprocket with the largest diameter among all those of the sprocket assembly.

The sprocket assembly of the invention comprises at least one second sprocket axially adjacent to said first sprocket and having a diameter different from that of said first sprocket.

Preferably, the second sprocket has a diameter smaller than that of said first sprocket.

Preferably, said first sprocket is obtained from an original sprocket having a number of first gearshifting teeth equal to the difference between the number of teeth of said original sprocket and the number of teeth of said second sprocket.

If the second sprocket is also obtained from an original sprocket from which teeth have been removed or teeth have been machined to be transformed into spurs, the number of first gearshifting teeth of the first sprocket is preferably equal to the difference between the number of teeth of the original sprocket from which the first sprocket is obtained and the number of teeth of the original sprocket from which the second sprocket is obtained.

Preferably, said first sprocket has a number of second spaces and/or of spurs equal to the difference between the number of teeth of said original sprocket and the number of teeth of said second sprocket or equal to twice said difference.

If the second sprocket is also obtained from an original sprocket from which teeth have been removed or teeth have been machined to be transformed into spurs, the aforementioned number of second spaces and/or spurs is preferably equal to the difference between the number of teeth of the original sprocket from which the first sprocket is obtained and the number of teeth of the original sprocket from which the second sprocket is obtained, or equal to twice said difference.

Preferably, the second spaces and/or spurs discussed above are provided both on the sprocket with the largest diameter among those of the sprocket assembly, and on the sprocket(s) closest to the aforementioned sprocket with the largest diameter (for example the two closest sprockets or, in the case of sprocket assemblies with a number of sprockets greater than 10, in the five or six closest sprockets). Therefore, what has been stated with respect to the sprocket of the invention applies not only to the sprocket of largest diameter among all those of the sprocket assembly but also to each of the other sprockets identified above.

In general, it is possible to provide for the presence of spurs on the end sprockets of the sprocket assembly, given that at such sprockets the gearshifting takes place when the chain is very inclined with respect to the aforementioned sprockets and thus more subject to falling down during pedaling backwards or in the absence of pedaling, whereas it is possible to provide for a removal of the teeth (without transforming them into spurs) on the central sprockets of the sprocket assembly, given that at such sprockets the gearshifting takes place while the chain is substantially parallel to the sprockets and thus less subject to falling down during pedaling backwards or in the absence of pedaling.

For these same reasons, it is also possible to provide for the presence of spurs having a radial extension substantially equal to that of the gearshifting teeth in the end sprockets of the sprocket assembly and of spurs having a smaller radial extension than that of the gearshifting teeth in the central sprockets of the sprocket assembly.

In FIG. 1, reference numeral 1 indicates a bicycle sprocket assembly in accordance with an embodiment of the present invention.

The sprocket assembly 1 is configured to be used in a rear wheel of a bicycle.

The sprocket assembly 1 comprises a plurality of sprockets with different diameters arranged axially adjacent to one another.

In the specific example illustrated in FIG. 1, 13 sprockets are provided with increasing numbers of teeth and diameters, starting from the sprocket with the smallest diameter, indicated with P1 to that with the largest diameter, indicated with P13.

Each sprocket P1-P13 comprises a respective radially outer annular portion in which a plurality of teeth arranged one after the other along a circumferential direction and a plurality of spaces are formed, each of the spaces being arranged between two respective circumferentially consecutive teeth.

In the specific example illustrated herein, the sprocket P1 comprises 9 teeth, the sprocket P2 comprises 10 teeth, the sprocket P3 comprises 11 teeth, the sprocket P4 comprises 12 teeth, the sprocket P5 comprises 13 teeth, the sprocket P6 comprises 14 teeth, the sprocket P7 comprises 16 teeth, the sprocket P8 comprises 18 teeth, the sprocket P9 comprises 21 teeth, the sprocket P10 comprises 25 teeth, the sprocket P11 comprises 30 teeth and the sprocket P12 comprises 36 teeth.

Figure 2:
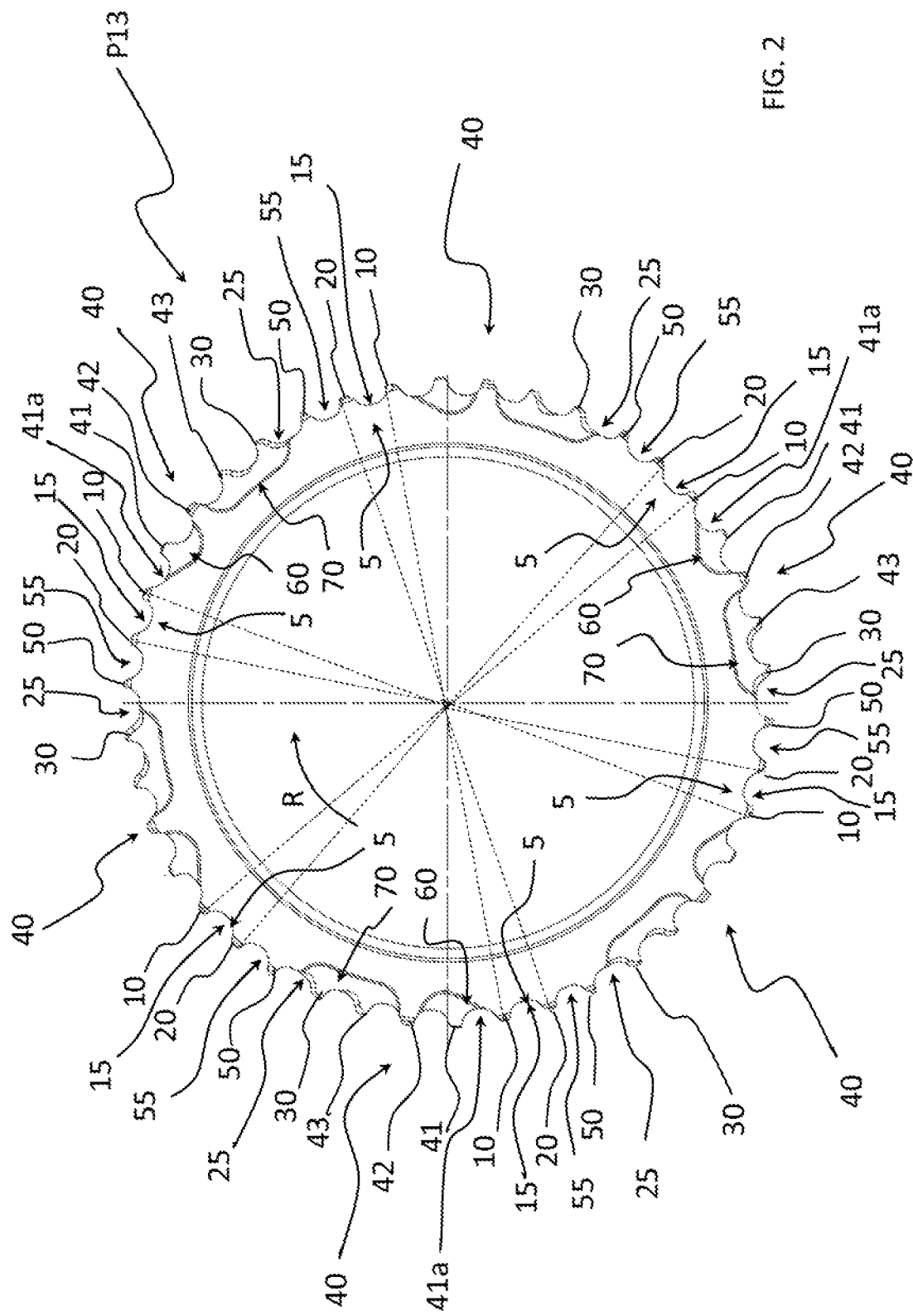
FIG. 2 is a front view of a sprocket in accordance with the present invention which can be used in the sprocket assembly of FIG. 1 (in the specific case which is herein illustrated it would be the sprocket with the greatest diameter)

With reference to FIG. 2, the sprocket P13 illustrated and described herein is a sprocket that originally comprised 42 teeth (identified as original teeth), six of which have been transformed into spurs 50 through removal of material from the respective original teeth.

In alternative embodiments that are not shown, all of the aforementioned six teeth are removed, or only some of them are removed and the others are transformed into spurs 50.

Therefore, the sprocket P13 illustrated in FIGS. 1 and 2 comprises 36 teeth and 6 spurs 50, wherein each spur 50 replaces a respective original tooth.

The sprocket P13 will be described in detail in the rest of this description with reference to FIG. 2. What is stated with reference to the sprocket P13 of FIG. 2 can have analogous application to each of the other sprockets of the sprocket assembly 1 of FIG. 1 (of course, in addition to the diameter of the sprocket, the number of teeth, of spaces and of spurs will vary).

Preferably, what is stated with reference to the sprocket P13 of FIG. 2 can be applied to sprockets having a number of original teeth greater than, or equal to, 18.

In the present description, when referring to an "upstream" or "downstream" position reference will always be made to the rotation direction R of the sprocket P13 indicated in FIG. 2, which corresponds to the direction of rotation of the sprocket assembly 1 during pedaling, i.e. to a clockwise direction of rotation with reference to the point of observation of FIG. 2.

The teeth of the sprocket P13 can all have the same circumferential extension. Similarly, the spaces of the sprocket P13 can all have the same circumferential extension, except when expressly stated otherwise.

As already stated, the sprocket P13 of FIG. 2 comprises a plurality of spurs 50.

It is possible to provide for various embodiments of such spurs 50.

Figure 3:
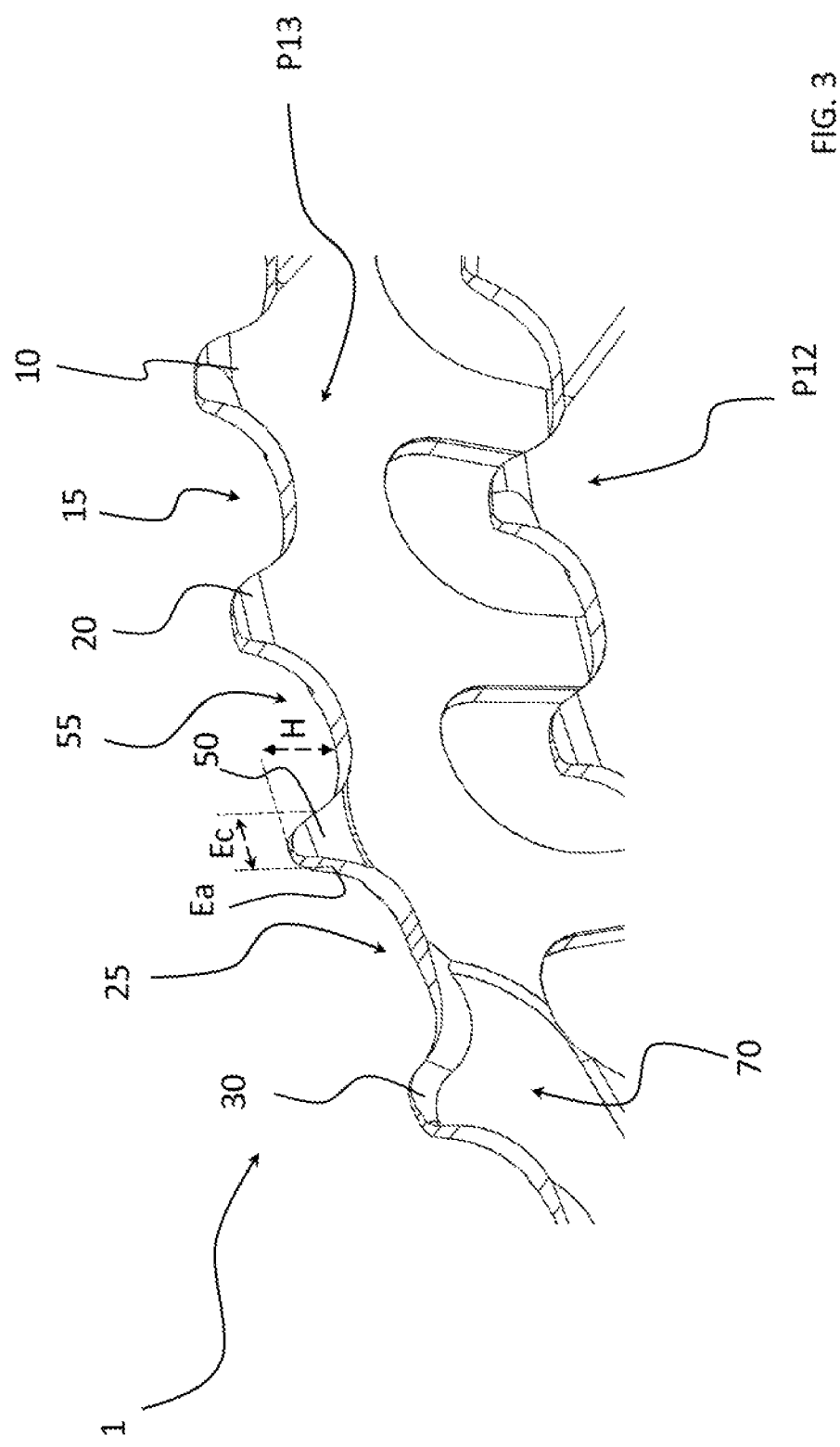
FIG. 3 is a front perspective view of an enlarged portion of the sprocket assembly of FIG. 1.
Figure 4:
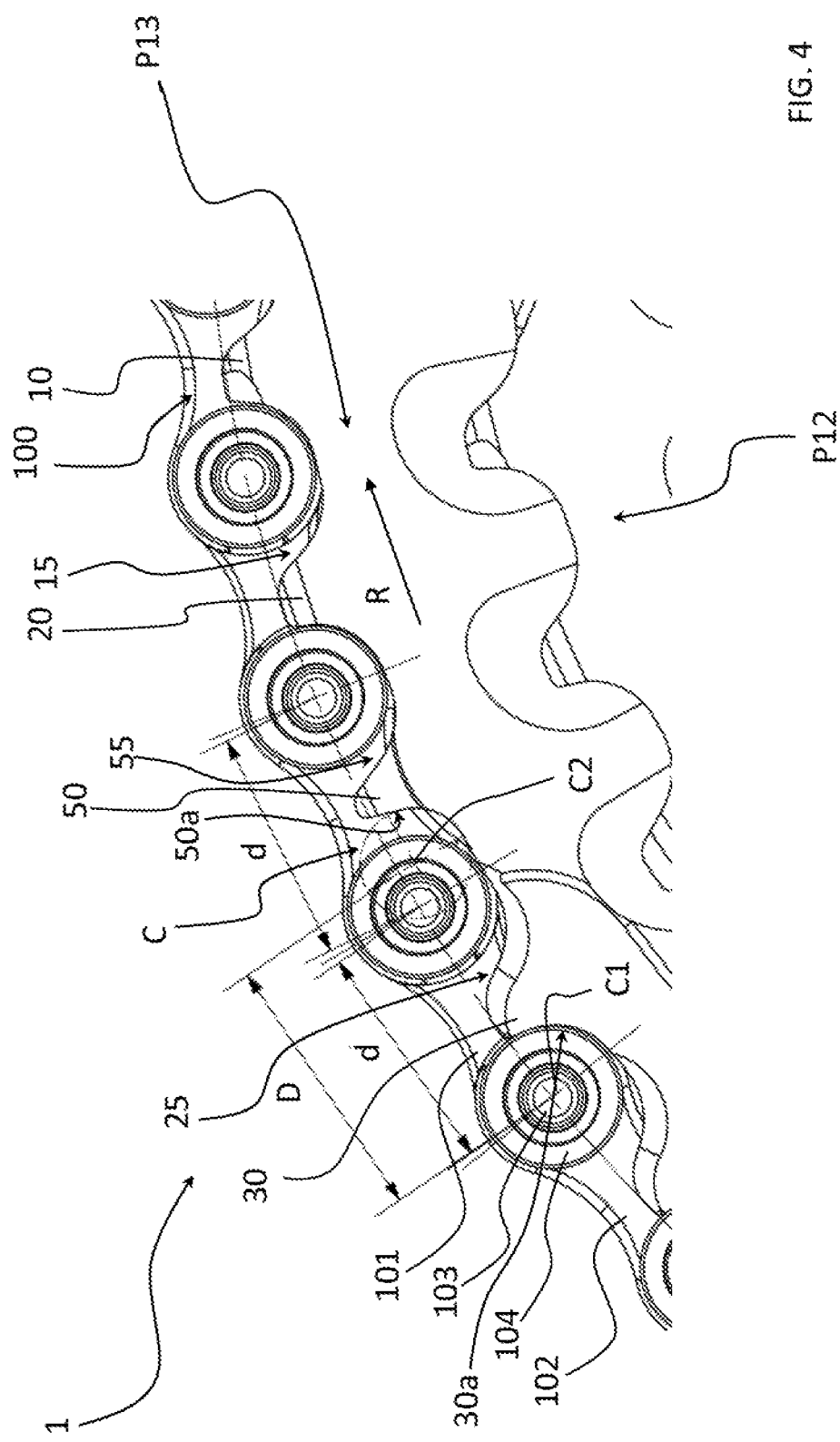
FIG. 4 is a perspective front view of the enlarged portion of FIG. 3 and of a portion of a bicycle chain engaged on the sprocket with the greatest diameter of the aforementioned sprocket assembly.

A first embodiment is the one used in the sprocket P13 of FIGS. 3-4. Such a spur 50 has a height or radial extension H substantially equal to that of the height of the sprocket P13 (in the figures the height H is slightly greater than that of the teeth of the sprocket P13), a circumferential extension Ec smaller than that of the teeth of the sprocket P13 and an axial extension Ea that, preferably, is smaller than that of the teeth of the sprocket P13.

Figure 5:
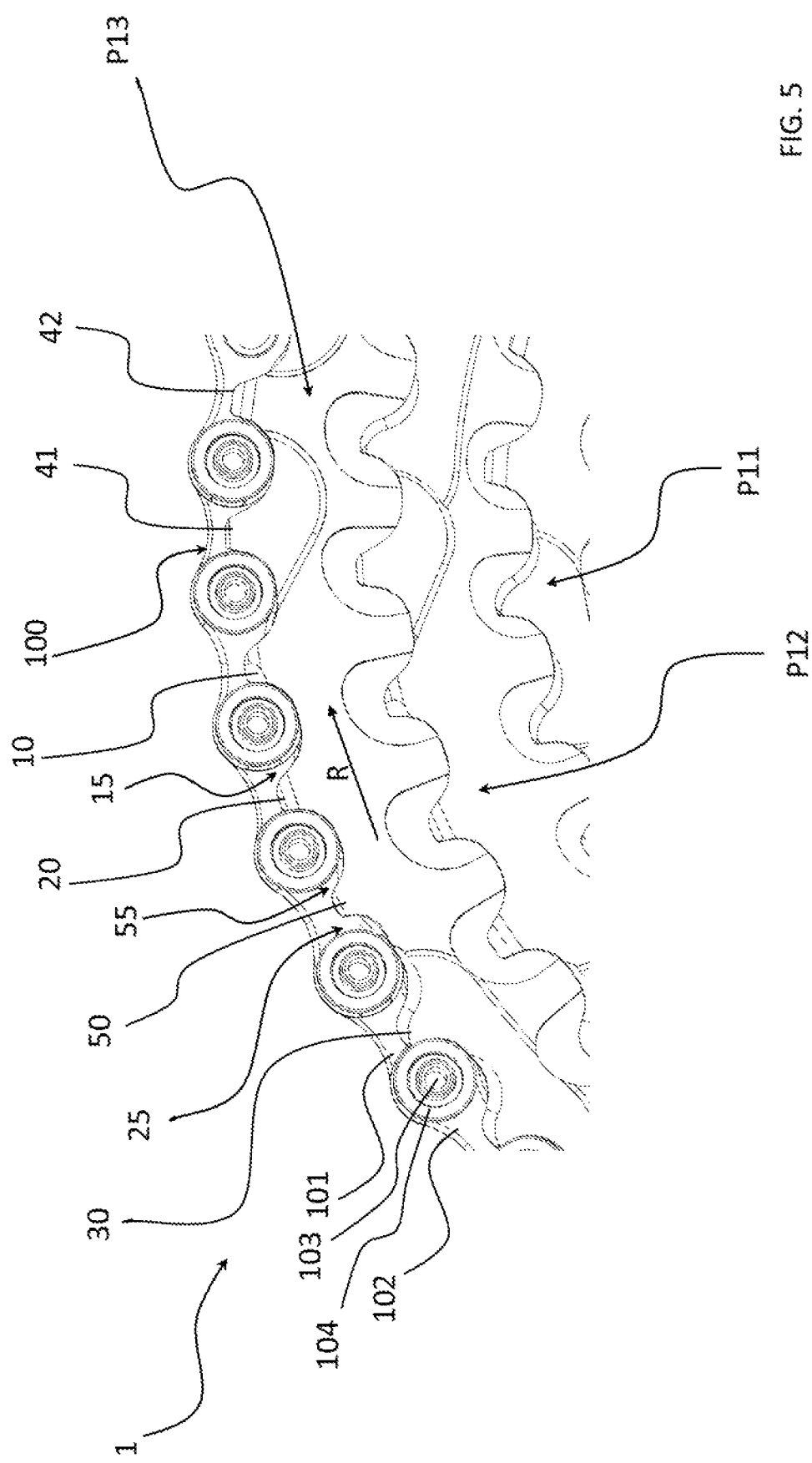
FIG. 5 is a perspective front view of an enlarged portion of a variant of the sprocket assembly of the present invention and of a portion of a bicycle chain engaged on the sprocket with the greatest diameter.

FIG. 5 shows a variant of the sprocket P13 that differs from that of FIGS. 3 and 4 in that it comprises spurs 50 having a height or radial extension smaller than that of the teeth of the sprocket P13. The circumferential extension, possibly also the axial extension, of such spurs 50 is smaller than that of the teeth of the sprocket P13.

Figure 6:
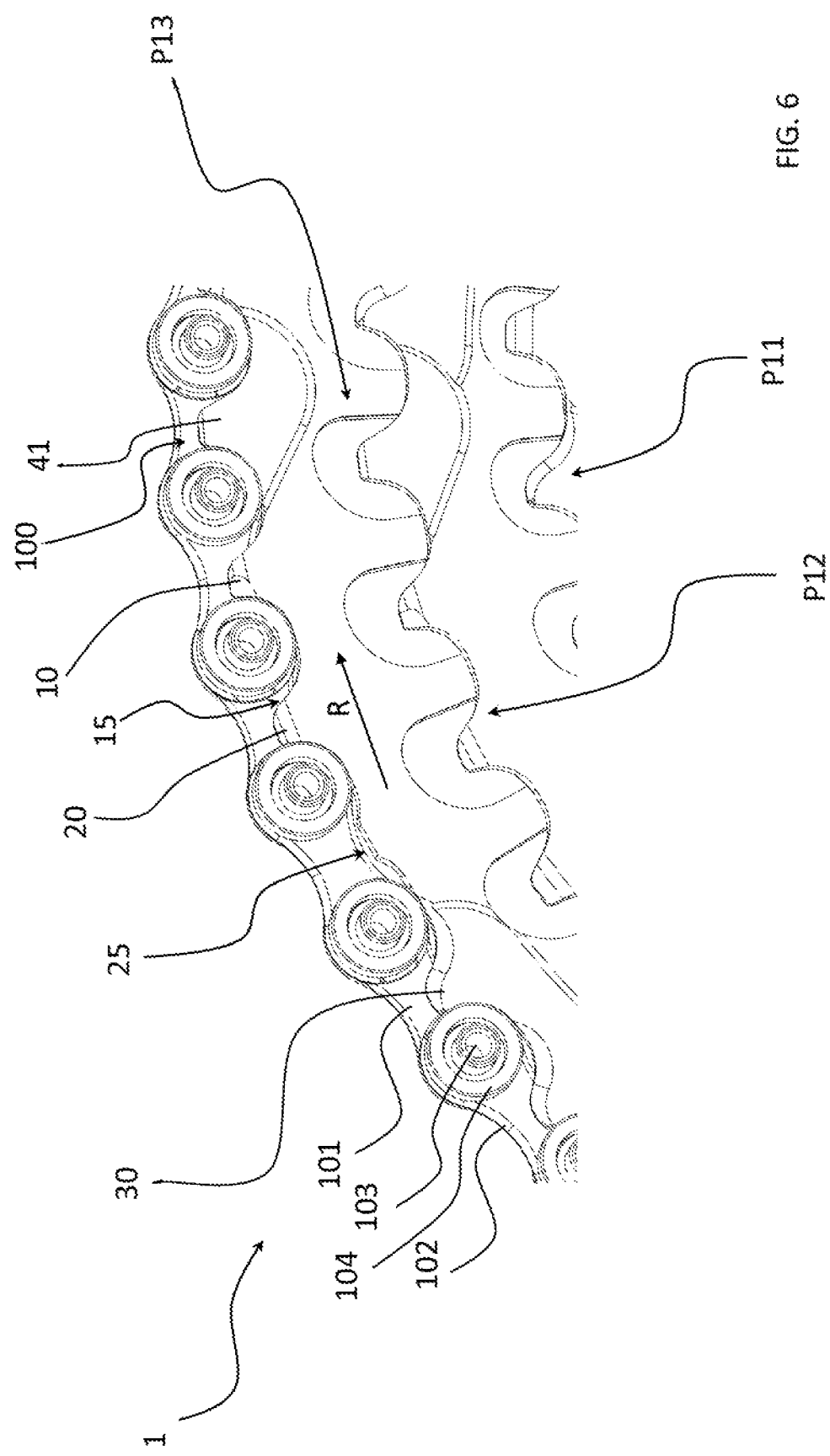
FIG. 6 is a perspective front view of an enlarged portion of another variant of the sprocket assembly of the present invention and of a portion of a bicycle chain engaged on the sprocket with the greatest diameter.

FIG. 6 shows a further variant of the sprocket P13 that differs from that of the previous figures in that it does not comprise any spur 50, but simply the removal of original teeth.

FIGS. 4-6 also illustrate a chain 100 engaged on the sprocket P13.

The chain 100 is of a conventional type and shape. It comprises an alternate succession of outer links and of inner links coupled to one another.

For the sake of an easy reading of the drawings, in FIGS. 4-6 the reference numerals associated with the components of the chain 100 are placed at only one of the outer links illustrated and at only one of the inner links illustrated.

Each outer link of the chain 100 comprises two outer plates 101 (only one of which is illustrated in FIGS. 4-6) and each inner link comprises two inner plates 102 (only one of which is illustrated in FIGS. 4-6). The plates of each link are arranged parallel and spaced apart to define a receiving space for a tooth of the sprocket P13. The outer plates 101 are more spaced than the inner plates 102 and partially overlap them at the respective end portions.

A rivet 103 rotatably joins the outer plates 101 to the inner plates 102 at each of the aforementioned end portions. For this purpose, at each of the aforementioned end portions the outer and inner plates 101, 102 have respective holes with substantially equal diameter and aligned to house the rivets 103.

A bush 104 configured to freely rotate around the axis of the rivet 103 is provided around each rivet 103 and between the two inner plates 102.

During pedaling, the portion of chain 100 illustrated in FIGS. 4-6 moves along the advancing direction indicated with A, the bushes 104 push the teeth of the sprocket P13 and the sprocket P13 (as well as the entire sprocket assembly 1) rotates in the clockwise direction according to the rotation direction indicated in FIGS. 2, 4-6 with R.

A gearshifting device (not illustrated) makes it possible to move the chain 100 from an engaging condition with a sprocket (the sprocket P12 in FIGS. 1, 4-6) to an engaging condition with another sprocket (the sprocket P13 in FIGS. 1, 4-6) and vice-versa, when desired by the cyclist.

With reference to FIG. 2, the sprocket P13 comprises a plurality of gearshifting areas 5. In the specific example illustrated herein, six gearshifting areas 5 are provided, which are angularly equidistant from each other, to give the sprocket P13 a geometric symmetry and uniformity.

Each gearshifting area 5 comprises a first gearshifting tooth 10, a second tooth 20 arranged immediately downstream of the first gearshifting tooth 10 and a first space 15 circumferentially arranged between the aforementioned first gearshifting tooth 10 and second tooth 20.

A plurality of properly shaped teeth 40 (three teeth in the embodiment illustrated herein) is provided upstream of the first gearshifting tooth 10 of each gearshifting area 5. In particular, a first tooth 41 of the plurality of teeth 40 is arranged immediately upstream of each first gearshifting tooth 10 (and thus in a proximal position with respect to the first gearshifting tooth 10), a second tooth 43 of the plurality of teeth 40 is arranged upstream of the first tooth 41 (and thus in a distal position with respect to the first gearshifting tooth 10) and a third tooth 42 is circumferentially arranged between the teeth 41 and 43.

A space 41a having a circumferential extension that can be substantially equal to that of the first space 15 is provided between the first gearshifting tooth 10 and the first tooth 41 of the plurality of teeth 40.

For the sake of an easy reading of the drawings, reference numerals 41, 42, 43 and 41a are placed only at three of the six gearshifting areas 5.

The first tooth 41 has a first shaped profile different from that of the first gearshifting tooth 10 and aimed at facilitating the gearshifting from the sprocket P12 to the sprocket P13 (upward gearshifting), whereas the second tooth 43 has a second shaped profile different from the aforementioned first shaped profile and from that of the first gearshifting tooth 10 and aimed at facilitating the gearshifting from the sprocket P13 to the sprocket P12 (downward gearshifting).

The aforementioned shaped profiles are obtained by making proper bevels on the front face (i.e. the face perpendicular to the rotation axis of the sprocket P13 and facing towards the sprocket P12) and/or rear face (i.e. the face perpendicular to the rotation axis of the sprocket P13 and opposite the front face) of the respective teeth 41, 43.

Again to facilitate the upward and downward gearshifting the sprocket P13 comprises, on the front face facing towards the sprocket P12 and between each pair of circumferentially consecutive gearshifting areas 5, a first ramp 60 configured to facilitate the upward gearshifting and a second ramp 70 configured to facilitate the downward gearshifting.

For the sake of an easy reading of the drawings, in FIG. 2 the reference numerals 60 are associated with only three of the six first ramps illustrated and the reference numerals 70 are associated with only three of the six second ramps illustrated.

The aforementioned ramps 60, 70 are obtained by making respective properly shaped recesses on the front face (i.e. the face perpendicular to the rotation axis of the sprocket P13 and facing towards the sprocket P12) of the sprocket P13. The shape of the recesses 60 is different from that of the recesses 70.

Downstream of each second tooth 20 a respective third tooth 30 is provided and, between each second tooth 20 and the respective third tooth 30, a second space 25 having a circumferential extension greater than that of the first space 15 is provided.

In the embodiments of FIGS. 1-5, each second space 25 is defined between the aforementioned third tooth 30 and a respective spur 50 arranged immediately upstream of said third tooth 30, i.e. circumferentially arranged between the aforementioned second tooth 20 and third tooth 30. The spur 50 is obtained through mechanical processing of the original tooth circumferentially arranged between the second tooth 20 and the third tooth 30.

Each spur 50 is positioned outside of a respective gearshifting area 5, in particular downstream of the latter and upstream of the circumferentially consecutive one.

A space 55 is provided between the spur 50 and the second tooth 20.

In the particular embodiment illustrated in FIGS. 1-5, the spur 50 is obtained by machining the respective original tooth of the original sprocket on both of the opposite side surfaces thereof. Therefore, both the space 25 downstream of the spur 50 and the space 55 upstream of the spur 50 have a circumferential extension greater than that of the first space 15. The spur 50 could however also be obtained by machining only the downstream side surface of the aforementioned original tooth, in which case the space 55 could have a surface extension substantially equal to that of the first space 15 and only the space 25 could have a surface extension greater than that of the first space 15.

In the specific example illustrated in FIG. 4, the center of two consecutive bushes 104 of the chain 100 (thus the so-called "chain pitch") has a predetermined circumferential distance d, for example equal to about 12.7 mm. Such a distance d is equal to the distance between the teeth 10 and 20, the latter being obtained by measuring the distance between the downstream side surfaces of the teeth 10, 20 of the sprocket P13.

The tooth 30 has a downstream side surface 30a defined by an arc of circumference having a center C1 in the center of the bush 103 which is in contact with such a tooth 30.

The spur 50 has a downstream side surface 50a defined by an arc of circumference having a center C2 in the center of the circumference C illustrated with a broken line in FIG. 4. The center C2 is spaced from the center C1 by a circumferential segment having a predetermined extension D. Such an extension D is equal to the sum of the chain pitch plus at least about 0.5 mm, preferably plus at least about 1 mm, more preferably plus at most about 1.7, for example equal to about 1.5 mm. Therefore, due to the surface machining on the downstream side surface 50a of the spur 50 such a side surface is shifted with respect to the downstream side surface of the original tooth that is then transformed into said spur 50 by a segment having the aforementioned extension D.

In the embodiments of FIGS. 1 and 2, each spur 50 is arranged between two circumferentially consecutive first gearshifting teeth 10 and all of the spurs 50 are angularly equidistant from each other.

In such embodiments, the spurs 50 and the second spaces 25 are arranged in a non-symmetrical position with respect to the first gearshifting teeth 10, i.e. in a non-centered position with respect to the respective pair of first gearshifting teeth 10 defined by the first gearshifting tooth 10 arranged upstream of the spur 50 and the first gearshifting tooth 10 arranged downstream of the spur 50.

As already stated, in the sprocket P13 of FIG. 6 no spurs 50 are provided. In this case, the original tooth that in the sprockets P13 of FIGS. 1-5 is transformed into spur 50 is completely removed. The second space 25 is thus defined between the second tooth 20 and the third tooth 30 and has a circumferential extension greater than twice that of the first space 15, for example greater than or substantially equal to the sum of the circumferential extension of the first gearshifting tooth 10 and twice that of the first space 15.

Figure 7:
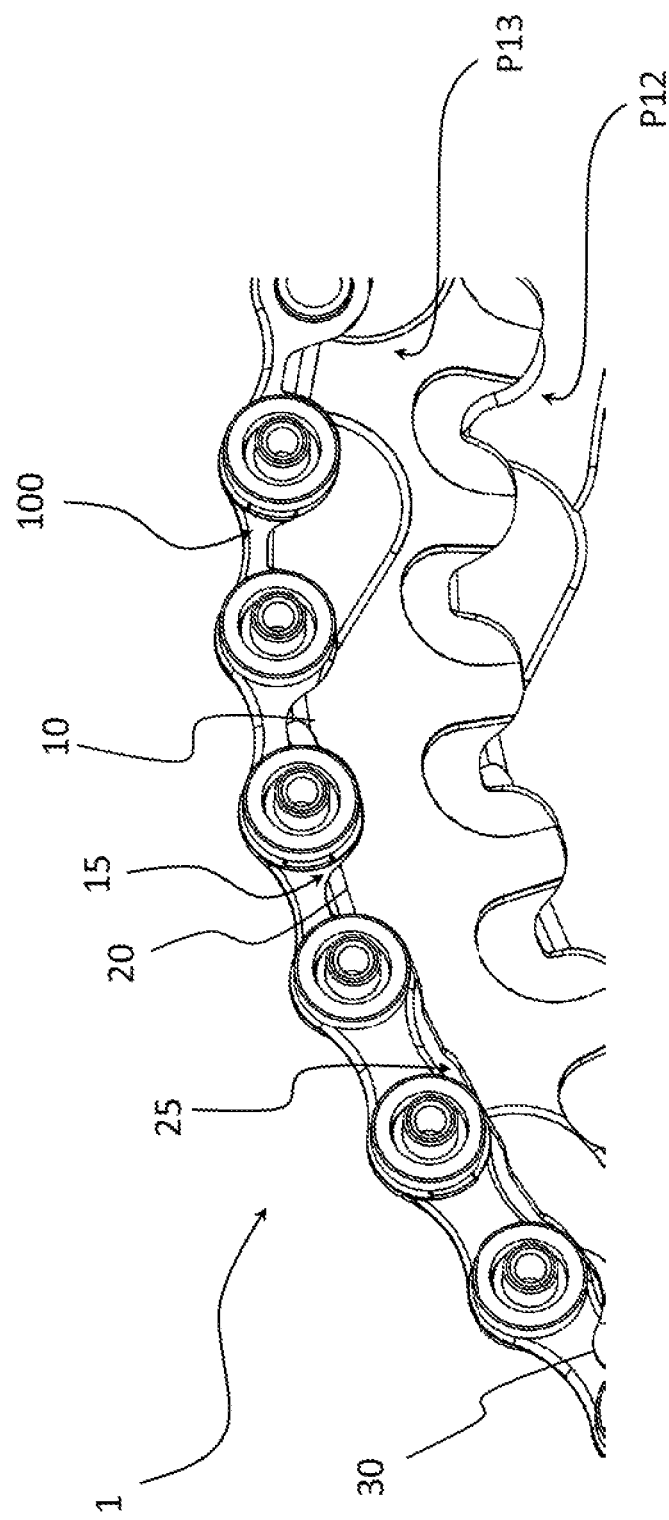
FIG. 7 is a front perspective view of an enlarged portion of a further variant of a sprocket assembly in accordance with the present invention and of a portion of a bicycle chain engaged on the sprocket with the greatest diameter.

FIG. 7 shows a variant of the sprocket assembly 1 that differs from that of FIG. 6 in that the two teeth of the original sprocket immediately downstream of the second tooth 20 have been removed. The second space 25 is thus defined between the second tooth 20 and the third tooth 30 and has a circumferential extension greater than three times that of the first space 15, for example greater than or substantially equal to the sum of twice the circumferential extension of the first gearshifting tooth 10 and three times the circumferential extension of the first space 15.

Figure 8:
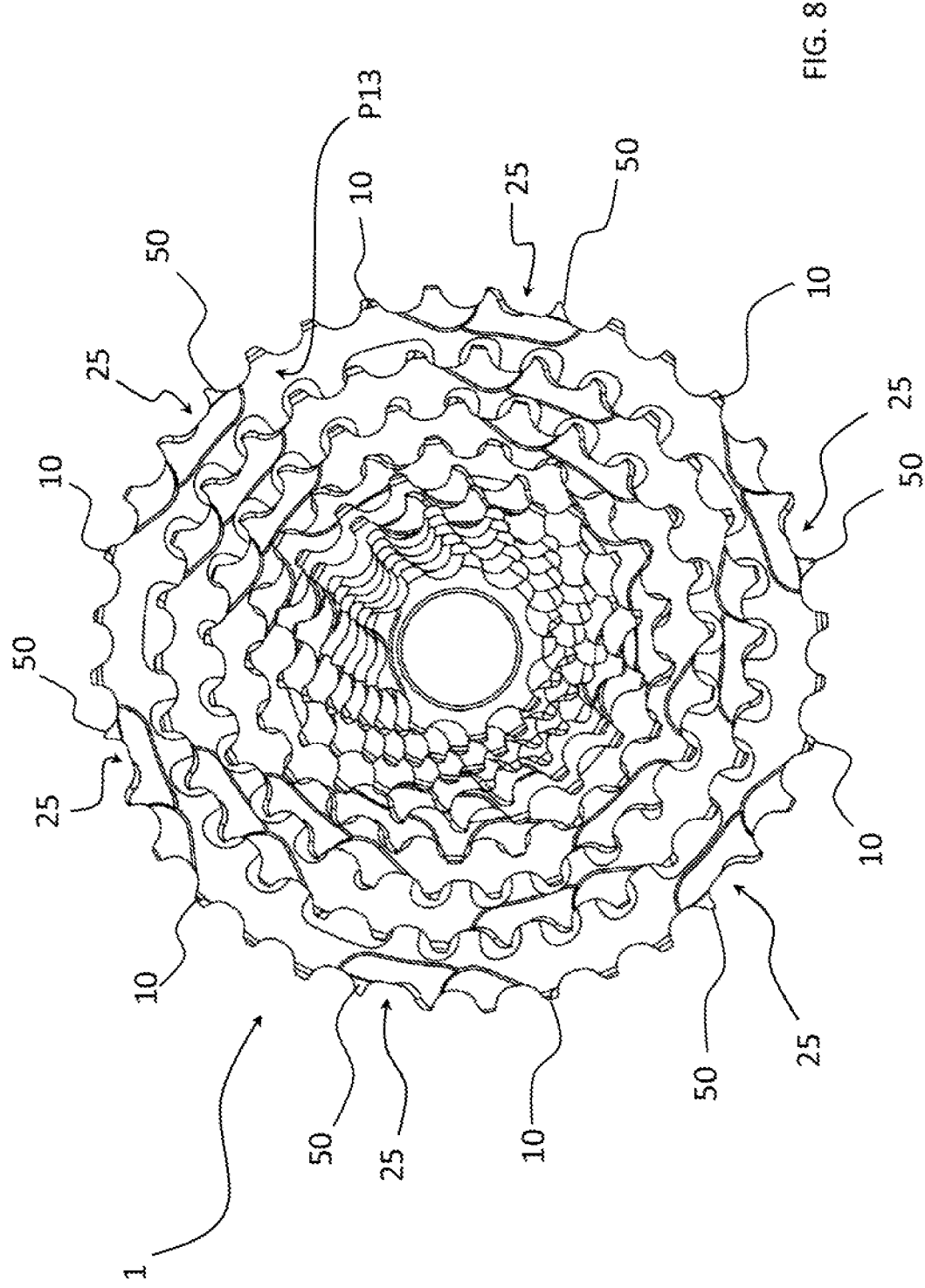
FIG. 8 is a front perspective view of a further variant of a sprocket assembly in accordance with the present invention.

FIG. 8 illustrates a variant of the sprocket assembly 1 that differs from that of FIGS. 1-2 only in that the spurs 50 are arranged in a symmetrical position with respect to the first gearshifting teeth 10. for the rest, what has been described above with respect to FIGS. 2-5 also applies to the sprocket P13 of FIG. 8.

In other variants of the sprocket assembly 1 that are not shown, the second spaces 25 are arranged in a symmetrical position with respect to the first gearshifting teeth 10.

Figure 9:
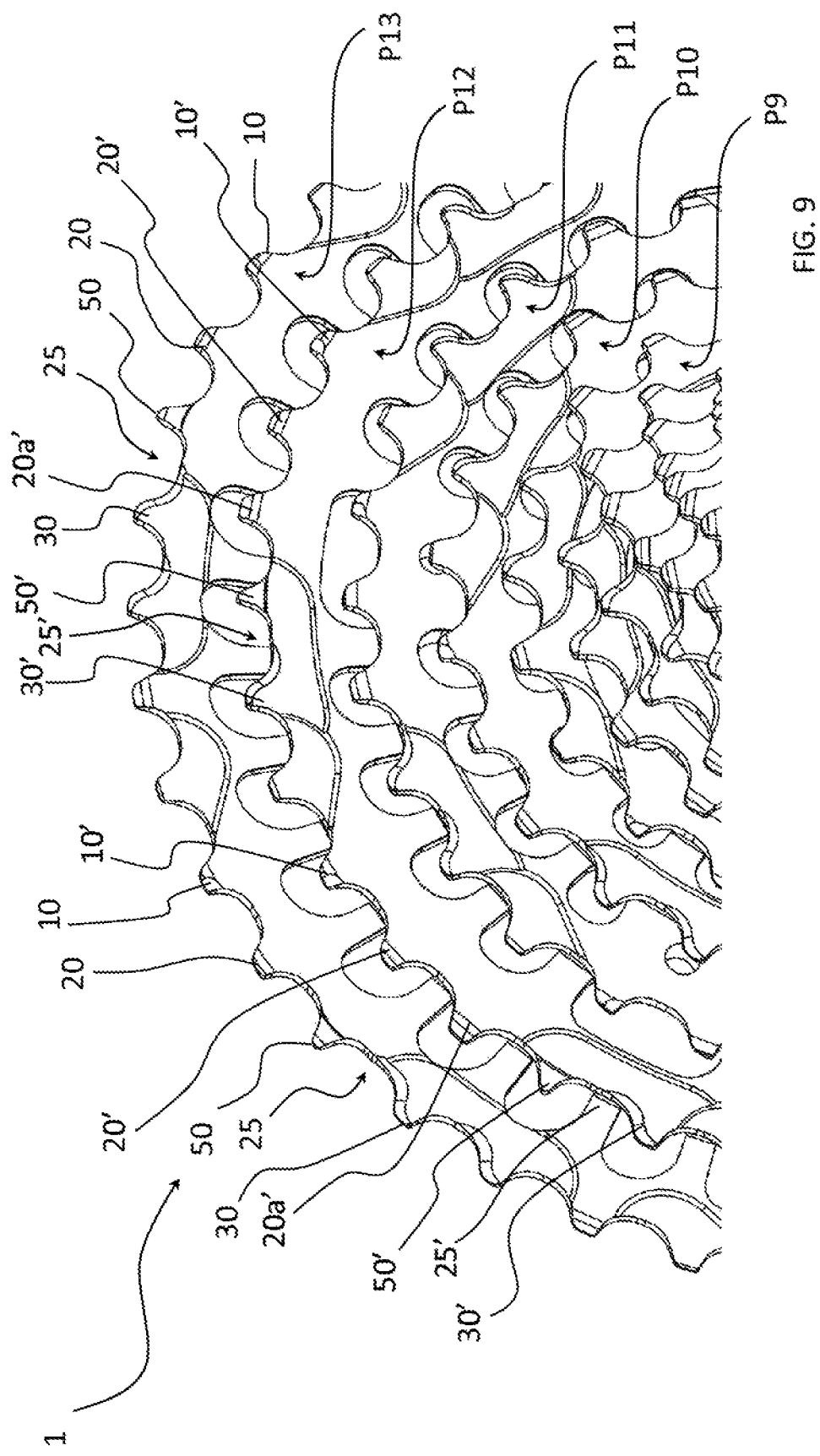
FIG. 9 is a front perspective view of an enlarged portion of a further variant of a sprocket assembly in accordance with the present invention.

FIG. 9 shows a variant of the sprocket assembly 1 that differs from the sprocket assembly of FIGS. 1 and 2 only in that also the sprocket P12 comprises a plurality of spurs 50'. Each of such spurs 50' is arranged between two teeth 20a' and 30'. The tooth 20a' is circumferentially consecutive to the tooth 20'. The latter is circumferentially consecutive to the first gearshifting tooth 10'. Between the spur 50' and the tooth 30' a space 25' is defined that has the features discussed above with reference to the second space 25 of the sprocket P13 of FIGS. 1 and 2. For the rest, what has been described above with respect to FIGS. 2-5 also applies to the sprocket P13 of FIG. 9.

Figure 10:
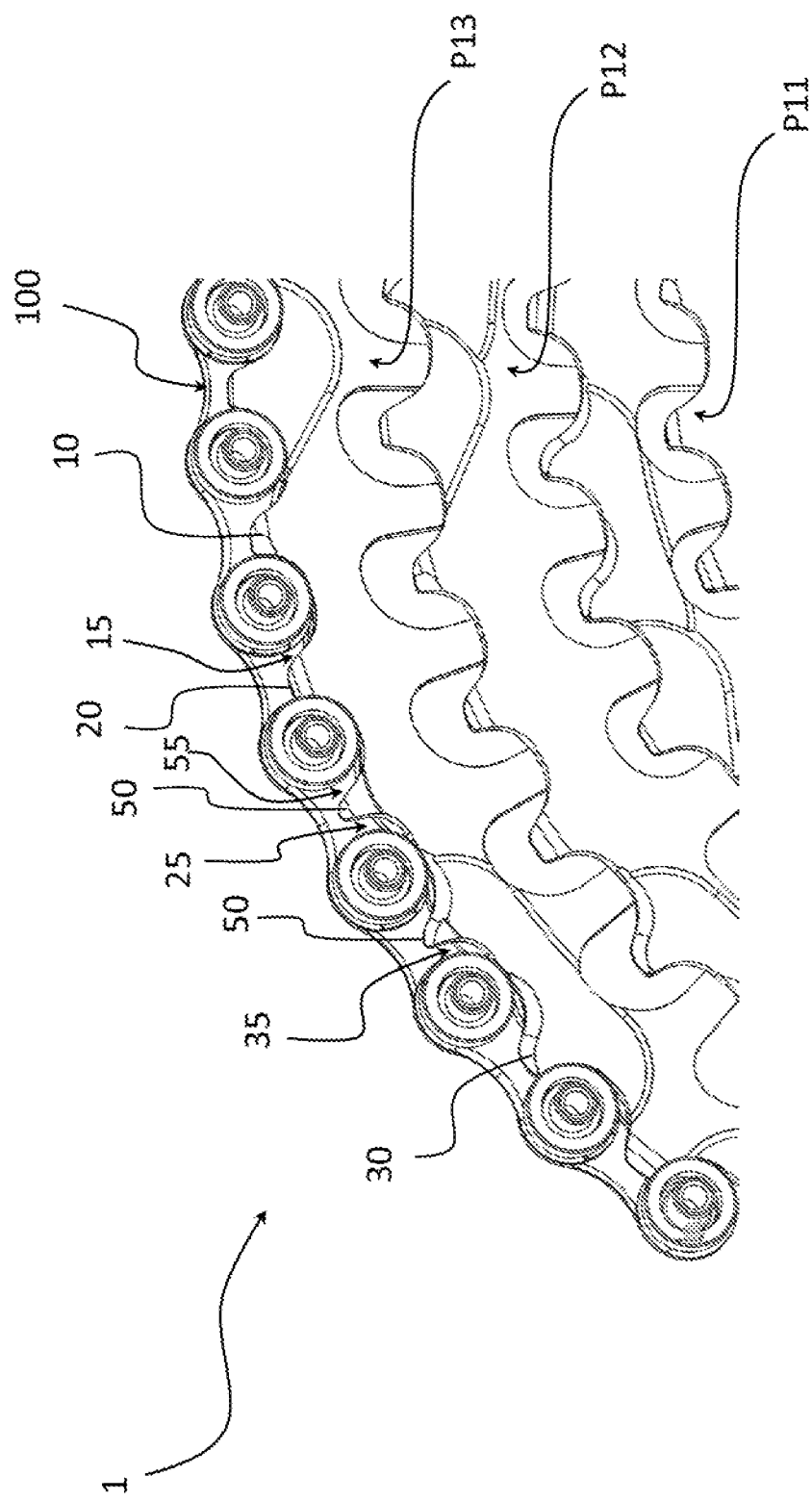
FIG. 10 is a front perspective view of an enlarged portion of a further variant of a sprocket assembly in accordance with the present invention and of a portion of a bicycle chain engaged on the sprocket with the greatest diameter.
Figure 11:
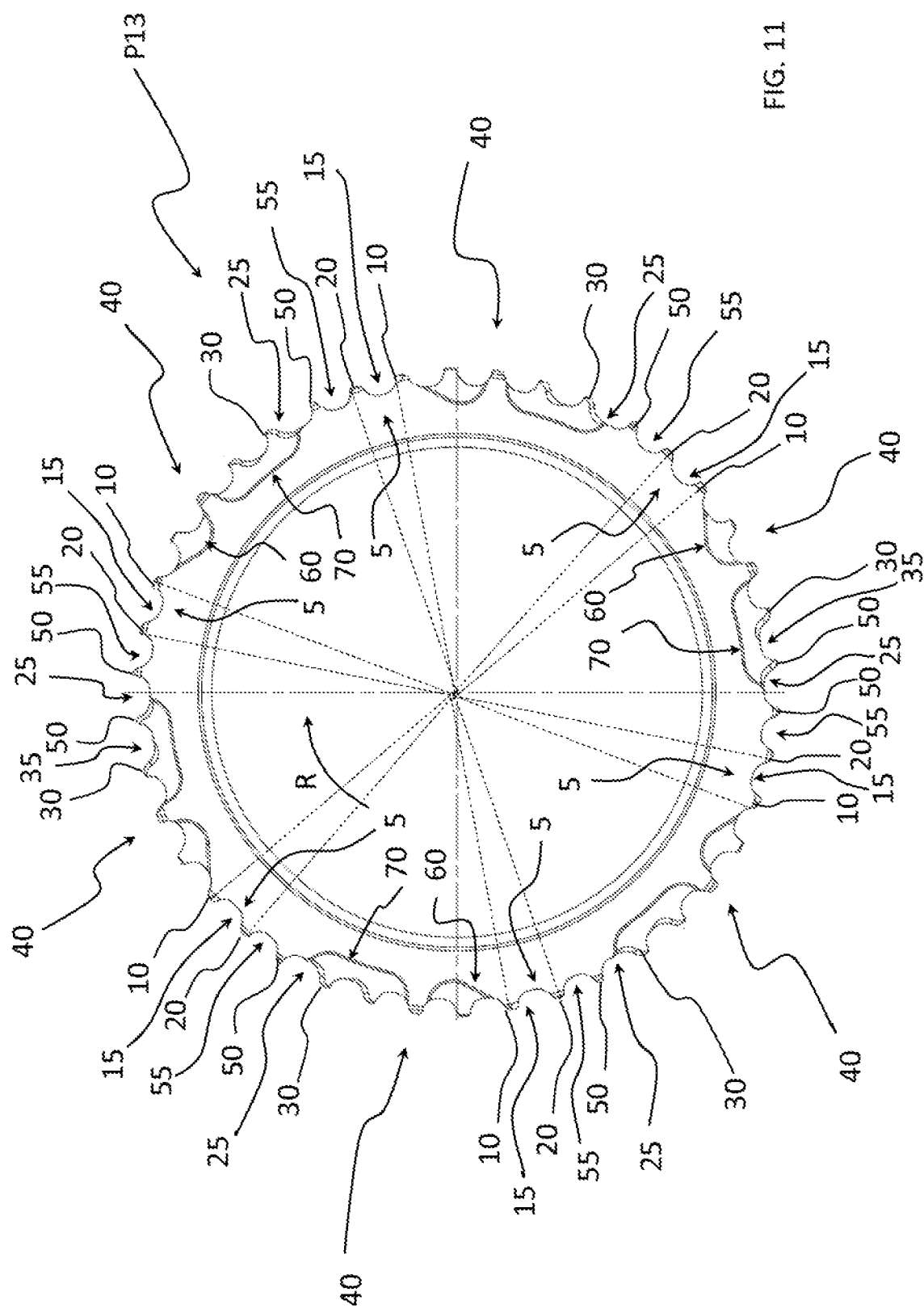
FIG. 11 is a front view of a sprocket in accordance with the present invention which can be used in the sprocket assembly of FIG. 10 (in the specific case which is herein illustrated it would be the sprocket with the greatest diameter)

FIGS. 10 and 11 respectively show a further variant of the sprocket assembly 1 and a further variant of a sprocket P13 which can be used in the sprocket assembly of FIG. 10. Such variants differ from those of FIGS. 1 and 2 only in that the sprocket P13 comprises, at two diametrically opposite portions (one of which is shown in FIG. 10), at least two circumferentially consecutive spurs 50 and in that the second space 25 is arranged between the two spurs 50.

The sprocket P13 of FIGS. 10 and 11 is therefore a sprocket that originally comprised 42 original teeth, eight of which have been transformed into spurs 50. The sprocket P13 shown in FIGS. 10 and 11 thus comprises 34 teeth and 8 spurs 50.

The second space 25 of the aforementioned sprocket P13 has, except in the aforementioned two diametrically opposite portions, the same features discussed above with reference to the second space 25 of the sprocket P13 of FIGS. 1-2. It is thus defined between a respective spur 50 and a respective third tooth 30 immediately consecutive to said spur 50.

On the other hand, in the aforementioned two diametrically opposite portions the second space 25 is defined between the two circumferentially consecutive spurs 50 and the third tooth 30 is arranged immediately downstream of the two spurs 50.

A space 35 is defined between the third tooth 30 and the spur 50 furthest downstream among the aforementioned two spurs 50. The space 35 also has a circumferential extension greater than that of the space 15 arranged between the first gearshifting tooth 10 and the second tooth 20.

Upstream of the two spurs 50, and thus between the second tooth 20 and the spur 50 furthest upstream among the aforementioned two spurs 50, there is a space 55 that, in the particular embodiment of FIG. 10, also has a circumferential extension greater than that of the space 15 arranged between the first gearshifting tooth 10 and the second tooth 20.

For the rest, what has been described above with respect to FIGS. 2-5 also applies to the sprocket P13 of FIGS. 10 and 11.

Figure 12:
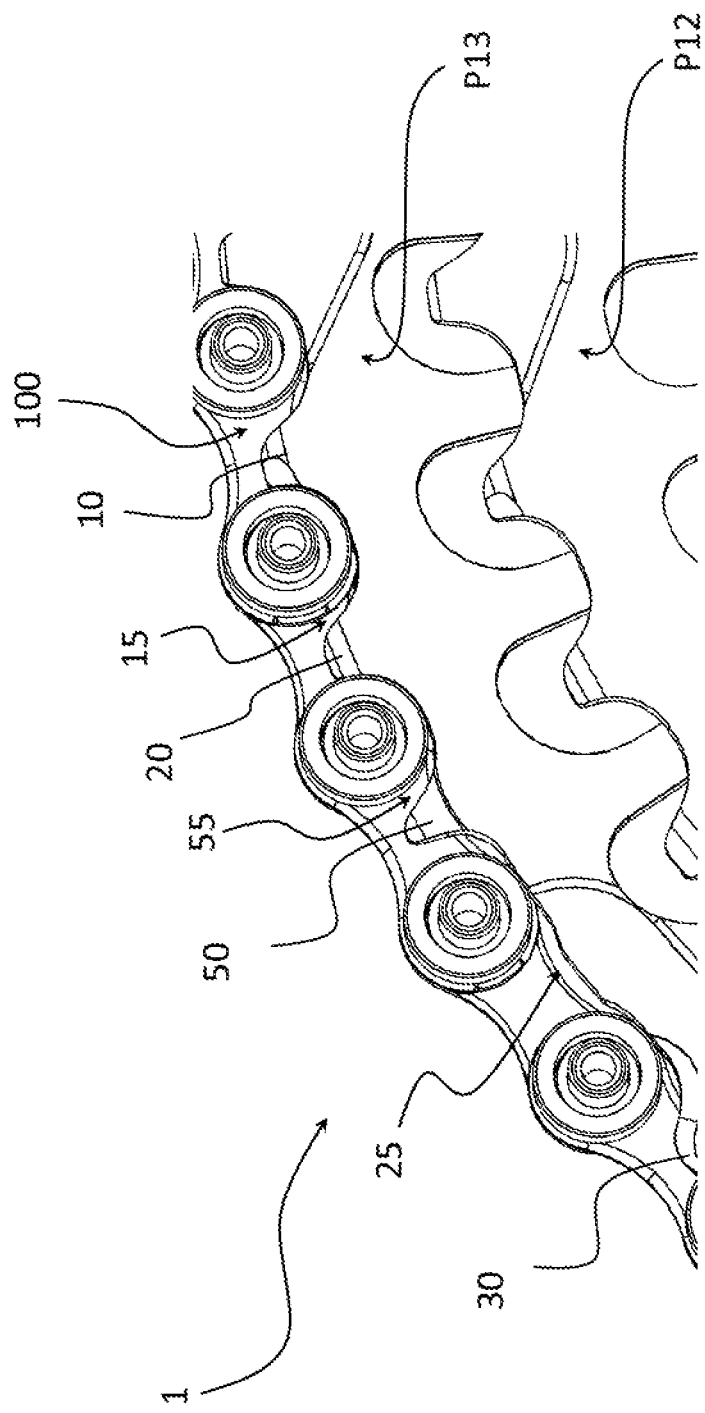
FIG. 12 is a front perspective view of an enlarged portion of a further variant of a sprocket assembly in accordance with the present invention and of a portion of a bicycle chain engaged on the sprocket with the greatest diameter.

FIG. 12 illustrates a further variant of the sprocket assembly 1 that differs from that of FIGS. 1-2 in that the tooth of the original sprocket immediately downstream of the spur 50 has been removed. In this case, the second space 25 has a circumferential extension more than twice that of the first space, and in particular greater than or substantially equal to the sum of that of the first gearshifting tooth 10 and twice that of the first space 15.

For the rest, what has been described above with respect to FIGS. 2-5 also applies to the sprocket P13 of FIG. 12.

The number of spurs 50 of a sprocket (like for example the sprocket P13 of FIGS. 1 and 2) can be selected as a function of the number of original teeth of such a sprocket and of that of the immediately adjacent sprocket with a smaller diameter, as discussed below.

The number of original teeth (thus before considering the removal of teeth or the provision of spurs) of the sprocket is calculated as a function of the diameter Dp of the primitive circumference thereof with the following formula:

$$D_p = p \cdot \frac{1}{\sin\left(\frac{180°}{Z}\right)}$$

where:

p is the nominal pitch of the chain, which for the bicycle chain is typically fixed at half an inch (12.7 mm);

Z is the number of teeth of the sprocket.

For example, a sprocket with a number of original teeth equal to 42 (like for example the sprocket P13 of FIGS. 1 and 2) has a diameter Dp equal to about 170 mm.

As an example, considering the sprocket P13 of FIGS. 1 and 2 and an adjacent sprocket having a number of original teeth equal to 36 (like for example the sprocket P12 shown in FIG. 1), the number of first gearshifting teeth 10 of the sprocket P13 is equal to the difference of the number of teeth of the two sprockets P13 and P12, i.e. 6 first gearshifting teeth 10.

Therefore, 36 teeth remain which are potentially replaceable with spurs. Such 36 remaining teeth can be grouped into 6 sequences of 6 teeth each, each sequence comprising a gearshifting area 5, the teeth 10, 20, 30, the spaces 15, 25 and the plurality of teeth 40 as discussed above.

The Applicant has observed that having a number of consecutive spurs greater than 2 for each sequence of 6 teeth leads to an excessive load on the aforementioned 36 remaining teeth. Of such 36 remaining teeth the Applicant deems that it is advisable to replace at most 3 of them with spurs.

The Applicant has observed that positioning 2 consecutive spurs can be preferable since this ensures that one presses on the outer link and one on the inner link of the chain 100. Vice-versa, by alternating them it could be the case that all of them press on the outer link, and they would thus be slacker, and the risk for the chain 100 to drop down when not pedaling or pedaling backwards would increase.

The Applicant has thus deemed it appropriate to provide a number of spurs comprised between 6 and 12 in the sprocket P13.

According to the Applicant, the best compromise to avoid having an excessive load on the teeth and running the risk for the chain to drop down is to provide a single spur for every sequence of 6 teeth, for a total of 6 spurs, exactly as shown in the sprocket P13 of FIGS. 1 and 2.

Alternatively, the Applicant deems that in the sprocket P13 it is possible to provide a total of 9 spurs, with two consecutive spurs in three of the 6 sequences of 6 teeth.

In general, according to the Applicant the number of spurs of a sprocket is preferably equal to or twice the difference between the number of original teeth of the sprocket and the number of original teeth of the smallest sprocket immediately adjacent, i.e. equal to or twice the number of the first gearshifting teeth.

An analogous reasoning is applicable for the smallest sprockets of the sprocket assembly 1. Indeed, if on the one hand on the smallest sprockets the more limited number of gearshifting teeth could lead one thinking to have more teeth that do not intervene during gearshifting and that can therefore be transformed into spurs, on the other hand an excessive number of spurs would risk to penalize the fluidity of the motion of the chain and increase the risk for the chain to drop down, because there would be too few teeth engaged with the chain. Due to the limited contribution of weight reduction given by the removal of teeth or replacement with spurs in the sprockets with a limited number of teeth, it is particularly preferred to limit the removal of teeth or the replacement with spurs to the sprockets with a number of original teeth greater than, or equal to, 18.

Table 1 below indicates, based on the number of original teeth of two adjacent sprockets, the number of spurs that according to the Applicant it is possible to provide in the sprocket with the greatest diameter of the aforementioned two sprockets.

TABLE 1

| Number of original teeth in the sprocket having larger diameter | Number of spurs | Number of original teeth in the sprocket adjacent to the sprocket having larger diameter |
|---|---|---|
| 9 | 1-2 | 8 |
| 10 | 1-2 | 9 |
| 10 | 1-2 | 8 |
| 11 | 1-2 | 10 |
| 11 | 1-2 | 9 |
| 12 | 1-2 | 11 |
| 12 | 1-2 | 10 |
| 13 | 1-2-3 | 12 |
| 13 | 1-2 | 11 |
| 14 | 1-2-3 | 13 |
| 14 | 1-2-3 | 12 |
| 15 | 1-2-3 | 14 |
| 15 | 2-3-4 | 13 |
| 16 | 1-2-3 | 15 |
| 16 | 2-3-4 | 14 |
| 17 | 1-2-3 | 16 |
| 17 | 2-3-4 | 15 |
| 18 | 1-2-3-4 | 17 |
| 18 | 2-3-4 | 16 |
| 19 | 2-3-4-5 | 17 |
| 20 | 2-3-4-5 | 18 |
| 22 | 2-3-4-5 | 20 |
| 24 | 2-4-6 | 22 |
| 26 | 2-4-6 | 24 |
| 28 | 2-4-6 | 26 |
| 30 | 3-4-6 | 27 |
| 32 | 4-6-8 | 28 |
| 32 | 3-4-6-8 | 29 |
| 34 | 6-9-12 | 28 |
| 34 | 4-6-8-12 | 30 |
| 36 | 6-9-12 | 30 |
| 36 | 4-6-8-12 | 32 |
| 38 | 6-9-12 | 32 |
| 38 | 4-6-8-12 | 34 |
| 40 | 6-9-12 | 34 |
| 40 | 5-10-15 | 35 |
| 42 | 6-9-12-15 | 36 |
| 42 | 7-10-14 | 35 |
| 44 | 6-9-12-15 | 38 |
| 44 | 7-10-14 | 37 |
| 46 | 8-12-16 | 38 |
| 46 | 7-10-14-16 | 39 |
| 48 | 8-12-16 | 40 |
| 48 | 7-10-14 | 41 |
| 50 | 10-15-20 | 40 |
| 50 | 8-12-16-20 | 42 |
| 52 | 10-15-20 | 42 |

For example, for the sprocket P13 of FIGS. 1 and 2 (having 42 original teeth) it is possible to provide a number of spurs 50 equal to 6, or 9, or 12 or 15 in the case in which the sprocket P12 has a number of original teeth equal to 36, or a number of spurs 50 equal to 7, or 10, or 14 in the case in which the sprocket P12 has a number of original teeth equal to 35.

Of course, those skilled in the art can provide for numerous modifications and variants to the present invention in order to satisfy specific and contingent requirements, all of which are in any case within the scope of protection defined by the following claims.

What is claimed is:

1. A bicycle sprocket comprising a plurality of teeth arranged one after the other along a circumferential direction of the sprocket and a plurality of spaces, wherein each space is arranged between two teeth of said plurality of teeth;
    said plurality of teeth includes:
    at least one first gearshifting tooth; and
    at least one second tooth arranged immediately downstream of said at least one first gearshifting tooth with reference to a rotation direction (R) of the sprocket during pedaling; and
    said plurality of spaces includes:
    at least one first space defined between said at least one first gearshifting tooth and said at least one second tooth and having a predetermined circumferential extension; and
    at least one second space arranged downstream of said at least one second tooth with reference to said rotation direction (R);
    wherein said at least one second space has a circumferential extension greater than that of said at least one first space; and,
    wherein at least one spur is positioned downstream of said at least one second tooth with reference to said rotation direction (R) and is dimensioned to avoid engagement with a chain during rotation of the sprocket.

2. The sprocket according to claim 1, wherein said at least one second space is defined between two respective circumferentially consecutive teeth and the circumferential extension of said at least one second space is greater than twice that of said at least one first space.

3. The sprocket according to claim 1, wherein said at least one spur has a radial extension substantially equal to or smaller than that of said at least one first gearshifting tooth.

4. The sprocket according to claim 1, wherein said at least one spur has a circumferential extension and an axial extension that are smaller than a circumferential extension and axial extension of said at least one first gearshifting tooth.

5. The sprocket according to claim 1, wherein the circumferential extension of said at least one second space is greater than twice that of said at least one first space.

6. The sprocket according to claim 1, wherein said at least one second space is defined between said at least one spur and a respective third tooth arranged downstream of said at least one spur with reference to said rotation direction (R).

7. The sprocket according to claim 6, wherein:
    said respective third tooth is arranged immediately downstream of said at least one spur with reference to said rotation direction (R) and has a downstream side surface defined by an arc of circumference having a first center;
    said at least one spur has a downstream side surface defined by a second arc of circumference having a second center;
    a distance between said first center and said second center is equal to a distance between said first gearshifting tooth and said second tooth plus at least 0.5 mm.

8. The sprocket according to claim 1, wherein said at least one spur is arranged between two circumferentially consecutive teeth and the circumferential extension of said at least one second space is greater than or substantially equal to a sum of that of said at least one first gearshifting tooth and twice that of said at least one first space.

9. The sprocket according to claim 1, further comprising at least two circumferentially consecutive spurs and at least one third space arranged downstream of said at least two spurs, wherein said at least one second space is arranged between said at least two spurs and said at least one third space has a circumferential extension greater than that of said at least one first space.

10. The sprocket according to claim 1, further comprising a plurality of first gearshifting teeth and a plurality of spurs, wherein each spur is arranged between two circumferentially consecutive first gearshifting teeth.

11. The sprocket according to claim 10, wherein said spurs are angularly equidistant from each other.

12. The sprocket according to claim 10, wherein each spur is arranged in a symmetrical position with respect to a respective pair of circumferentially successive first gearshifting teeth.

13. The sprocket according to claim 1, wherein said sprocket is obtained from an original sprocket having a plurality of teeth comprising a number of original teeth equal to, or greater than, 18.

14. A bicycle sprocket assembly comprising a first sprocket according to claim 1.

15. The sprocket according to claim 6, wherein:
    said respective third tooth is arranged immediately downstream of said at least one spur with reference to said rotation direction (R) and has a downstream side surface defined by an arc of circumference having a first center;
    said at least one spur has a downstream side surface defined by a second arc of circumference having a second center;
    wherein a distance between said first center and second center is equal to a distance between said first gearshifting tooth and said second tooth plus at least 1.5 mm.

* * * * *